Oct. 30, 1928.

F. LOUISOT 1,689,555

PULP MOLD OF LAMINATE STRUCTURE

Filed Oct. 8, 1927

Inventor
Felix Louisot
By his Attorneys
Kenyon & Kenyon

Patented Oct. 30, 1928.

1,689,555

UNITED STATES PATENT OFFICE.

FELIX LOUISOT, OF HASBROUCK HEIGHTS, NEW JERSEY.

PULP MOLD OF LAMINATE STRUCTURE.

Application filed October 8, 1927. Serial No. 224,798.

This invention relates to laminated molds for forming articles from plastic material, paper or other pulp and similar materials.

An object of the invention is the provision of means for expeditiously loosening a molded article from such a mold.

According to this invtntion, the laminæ composing the mold are slidably mounted with respect to each other and means are provided for successively moving each lamina relative to the adjacent laminæ. Minute channels are cut in one surface of each lamina to provide means for applying suction to draw the pulp into the mold. These channels communicate with a chamber of relatively large volume which in turn is suitably connected with a vacuum pump or other suction means. With the laminæ in their normal positions suction is applied and pulp sucked into the mold and formed into the desired shape. At the same time the suction draws out from the pulp substantially all the fluid content so that the molded article is comparatively dry. The suction is then stopped and the article removed from the mold. Such removal is facilitated by successively moving the laminæ so that each lamina is individually moved out of engagement with the molded article. In this way the molded article is loosened from the mold without subjecting it to any pull or strain.

Other objects, novel features and advantages of this invention will be apparent from the following specification and accompanying drawings, wherein Figure 1 is a vertical section through a mold embodying the invention, the lamina being in normal shape.

Figure 3:
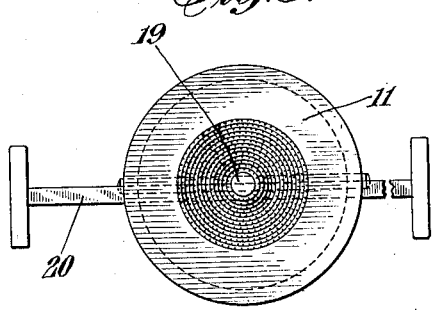
Fig. 3 is a plan view of the mold.

10 designates a cylindrical casing having at one end a disk-like cover 11 and at the other end a cover 12 formed with a boss 13. Within the casing 10 are provided annular guide or supporting members 14 and 15. A pin 16 extends diametrically through the annular member 15 and across the aperture in such member.

Figure 4:
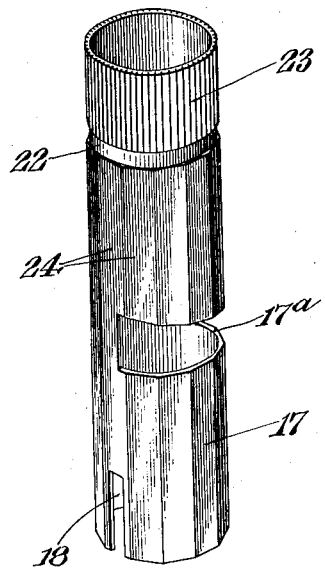
Fig. 4 is an enlarged perspective of one of the laminæ.

A plurality of cylindrical concentric laminæ 17 are arranged in the casing, each lamina having at one end a pair of notches 18 within which is received the pin 16. The outer lamina contacts with the inner surfaces of the cover 11 and the guide members 14 and 15. These laminæ are of different length so that their upper ends define a mold of any desired shape. A pin 19 is contained within the inner lamina and is likewise provided with a notch 18 receiving the pin 16. The upper end of this pin may project slightly into the mold cavity formed by the ends of the laminæ 17. As clearly shown in Fig. 4, each of the laminæ is cut away to form a notch 17ª, the ends of the notch being diametrically opposite each other. Each notch is of greater height at one end than at the other end. The pin 19 is provided with a transverse groove 19ª, the upper face of which is oblique so that one end of the groove is equal in height to the lower end of the notches and the other end thereof is of a height equal to the other ends of the notches. A plunger 20 having offset ends connected by an oblique portion 21 extends across the casing 10 and passes through the notches in the laminæ and the groove in the pin 19. The plunger is equal in thickness to the height of the lower end of the notches in the laminæ and is likewise less in thickness than the height of the opposite ends of the notches. When the plunger is in the position shown in Fig. 1 the laminæ and the pin 19 are in such position that their ends define the desired mold cavity. As the plunger 20 is moved to the position shown in Fig. 2 the lower face of the oblique portion 21 successively engages the lower edge of the notches 17ª, thus moving each lamina successively with respect to each other and with respect to the post 19, their upper ends being thus moved out of contact with the article molded in the cavity. Further movement of the pin 20 will move the plunger 19 and re-arrange the laminæ as they were originally except at a slightly lower level.

Adjacent the upper ends of the laminæ 17 are provided peripheral grooves 22. From these grooves to the upper ends of the laminæ are provided very fine longitudinal channels 23 cut in the surface of the laminæ. Below the grooves 22 the laminæ are formed with a plurality of flat faces 24 which define with the inner surface of the surrounding lamina a plurality of longitudinal channels. A hose 25 leading from a suitable suction means not shown has its end fitting over the boss 13. The apertures in the wall of the casing 10 through which the plunger 20 passes fits snugly around the plunger. If desired, suitable packing means may be provided around the plunger in order that the leakage of air thereinto may not interfere with the operation of the mold.

Figure 2:
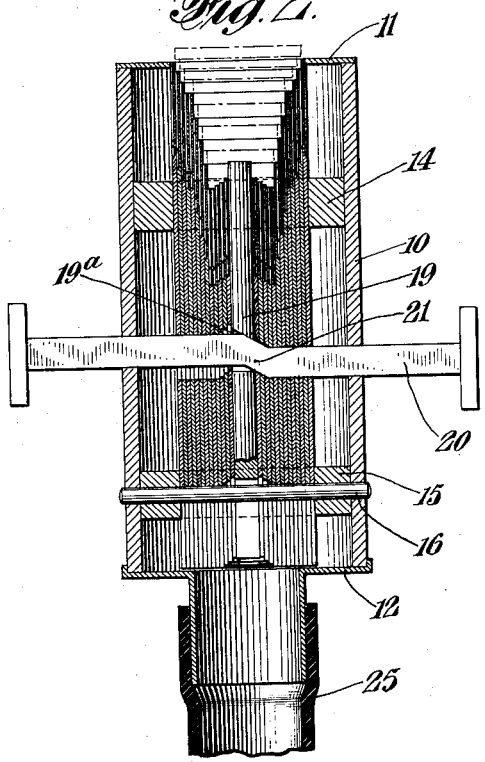
Figure 2 is a similar section with the laminæ in the position assumed after being moved away from the molded article.
Figure 1:
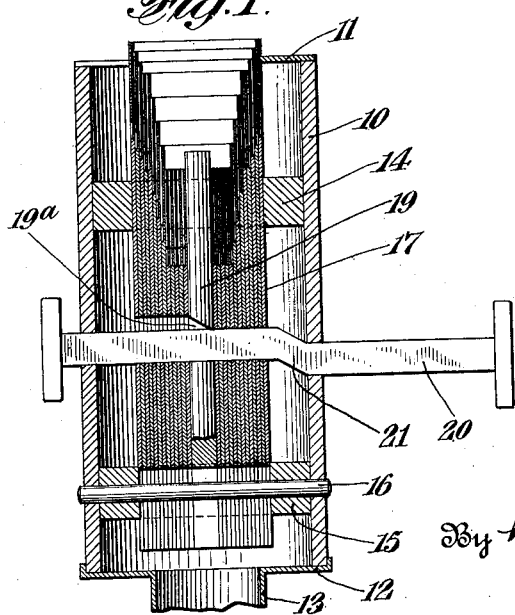

With the laminæ in the position shown in Fig. 1 the suction means are started and pulp introduced into the mold cavity formed by the ends of the laminæ. The pulp is drawn into proper position to form the desired article by the suction in the channels 23 and the major portion of the liquid content of the pulp is likewise drawn out through said channels. In this way the molded articles shown in dotted lines in Fig. 2 is produced. The suction is then turned off and the plunger 20 moved to the position shown in Fig. 2 or beyond such position. As the plunger is moved it causes the various laminæ successively to slide relative to each other so that the molded article is loosened from the mold. The plunger may be moved only part way or all the way but in any event the molded article is loosened. The plunger 20 is then returned into normal position and the operation repeated.

The minute channels 23 communicate with the relatively large chamber 22, thus making highly effective the action of the channels in drawing the pulp into proper position by suction. This chamber 22 communicates with channels of larger area than the channels 23, thus insuring that at all times during the operation of the device there is a relatively high degree of vacuum in the chamber 22. This is due to the fact that air can be drawn out of the chamber 22 faster than it can be admitted to it through minute channels 23. Preferably the channels 23 increase both in depth and in width from the edges of the laminæ to the chamber 22. This permits the ready removal from the channels of any fiber that may have been drawn into the mouths thereof. Clogging of the channels by fiber is prevented by this arrangement.

The provision of minute channels extending longitudinally of the laminæ effectively prevents accumulation of fibers at the edges of the laminæ. There is no tendency for the fibers to get together at the edges as there is in the case of the prior art molds having suction grooves formed by cutting back alternate laminæ. Moreover this arrangement gives to the articles a smoother finish than is possible with the prior art molds as the edges of the laminæ may be shaped to present a surface free of ridges or depressions.

It is of course understood that although the mold has been disclosed as embodying cylindrical laminæ, laminæ of other types may be made out of and moved relatively to each other in a similar manner to disengage a molded article from the mold formed by the laminæ. Moreover, it is apparent that various structural modifications may be made without in any way departing from the spirit of the invention as defined in the appended claims.

What I claim is:

1. In combination, a plurality of slidable laminæ, said laminæ having their edges defining a mold cavity and being provided with intervening channels and means for successively moving said laminæ relative to each other.

2. In combination, a plurality of slidable laminæ, said laminæ having their edges defining a mold cavity and being provided with intervening channels, notches provided in said laminæ and means successively to engage the edges of said notches to move said laminæ relative to each other.

3. In combination, a plurality of coaxial cylindrical slidable laminæ, said laminæ having their edges defining a mold cavity and being provided with intervening channels, and means for successively moving said laminæ relative to each other.

4. In combination, a plurality of coaxial cylindrical slidable laminæ, said laminæ having their edges defining a mold cavity and being provided with intervening channels, notches formed in said laminæ and means successively to engage the edges of said notches to slide said laminæ relative to each other.

5. In combination, a post, a plurality of cylindrical laminæ coaxial with said post and slidable relative to said post and to each other, said laminæ having their edges defining a mold cavity and being provided with intervening channels, and means for successively moving said laminæ relative to each other and to said post.

6. In combination, a post, a plurality of cylindrical laminæ coaxial with said post and slidable relative to said post and to each other, said laminæ having their edges defining a mold cavity and being provided with intervening channels, notches formed in said laminæ and said post and means successively to engage the edges of said notches and said post for moving said laminæ relative to each other and to said post.

7. In combination, a casing, a plurality of cylindrical laminæ slidably mounted in said casing, said laminæ having their edges defining a mold cavity and being provided with intervening channels, notches formed in said laminæ, and a plunger extending across said casing and through said notches, said plunger having an oblique portion to engage the edges of said notches for successively moving said laminæ relative to each other.

8. In combination, a plurality of laminæ, minute channels formed in one face of each lamina and leading from the edge thereof to a relatively large groove spaced from the edge of the lamina, and relatively large channels leading from said groove.

9. In combination, a plurality of coaxial cylindrical laminæ, a peripheral groove in each lamina spaced from the edge thereof, longitudinal minute channels leading from said groove to the edge of the lamina and flat surfaces leading from said groove to the opposite end of said lamina.

10. In combination, a casing, a plurality of coaxial cylindrical laminæ mounted in said casing, each lamina having a peripheral groove spaced from one edge thereof, longitudinal minute channels leading from said groove to said edge and flat surfaces leading from said groove to the opposite end of the lamina, and means for connecting said casing with suction.

11. In combination, a casing, a plurality of coaxial cylindrical laminæ mounted in said casing, each lamina having a peripheral groove spaced from one edge thereof, longitudinal minute channels leading from said groove to said edge and flat surfaces leading from said groove to the opposite end of the lamina, means for moving said laminæ successively relative to each other and means for connecting said casing with suction means.

12. In combination, a casing, a plurality of coaxial cylindrical laminæ mounted in said casing, each lamina having a peripheral groove spaced from one edge thereof, longitudinal minute channels leading from said groove to said edge and flat surfaces leading from said groove to the opposite end of the lamina, said lamina having notches, a member extending across said casing and through said notches, said member having an oblique portion to engage the edges of said notches for successively moving said laminæ relative to each other and means for connecting said casing with suction means.

In testimony whereof, I have signed my name to this specification.

FELIX LOUISOT.